June 17, 1924.

S. O. HULETT 1,498,277

DIFFERENTIAL

Filed Oct. 23, 1922

S. O. Hulett
INVENTOR

BY Victor J. Evans
ATTORNEY

June 17, 1924.
S. O. HULETT
1,498,277
DIFFERENTIAL
Filed Oct. 23, 1922
2 Sheets-Sheet 2
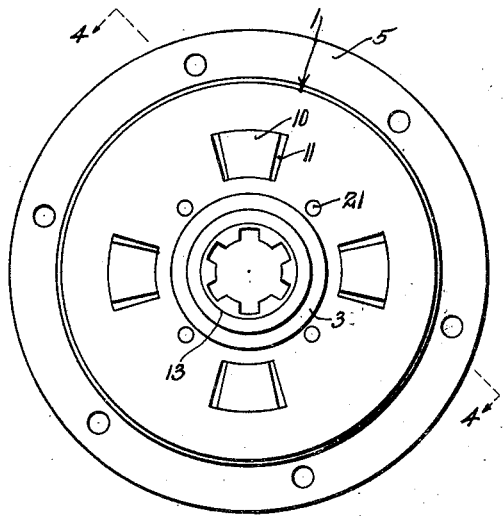
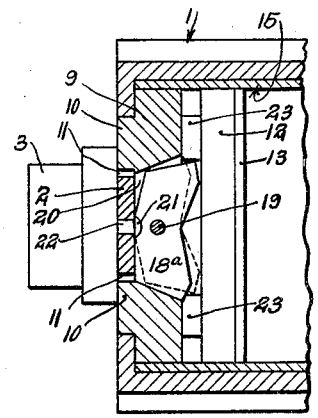
S. O. Hulett
INVENTOR
BY Victor J. Evans
ATTORNEY Patented June 17, 1924.

1,498,277

UNITED STATES PATENT OFFICE.

SNOE O. HULETT, OF CORRY, PENNSYLVANIA.

DIFFERENTIAL.

Application filed October 23, 1922. Serial No. 596,413.

*To all whom it may concern:*

Be it known that I, SNOE O. HULETT, a citizen of the United States, residing at Corry, in the county of Erie and State of Pennsylvania, have invented new and useful Improvements in Differentials, of which the following is a specification.

This invention relates to differentials, and more particularly to a differential specially adapted for use in connection with automobiles.

One of the main objects of the invention is to provide a differential which is simple in construction and positive in operation and in which all unnecessary gears are eliminated. A further object is to provide a differential including a driven member in conjunction with members secured to the axles of the automobile, the driven member having movement in either direction through a predetermined distance relative to the members secured on the axles, means being provided for establishing driving connections between said driven member when it has been turned through a predetermined distance and the members on the axles. Further objects will appear from the detailed description.

In the drawings:—

Figure 3 is an end view;

Figure 4 is a section taken substantially on line 4—4 of Fig. 3;

Figure 5 is a section taken substantially on line 5—5 of Fig. 2;

Figure 6 is a section taken substantially on line 6—6 of Fig. 2;

Figure 7 is a fragmentary detail section through one of the driving blocks and associated parts.

Figures 1, 2:
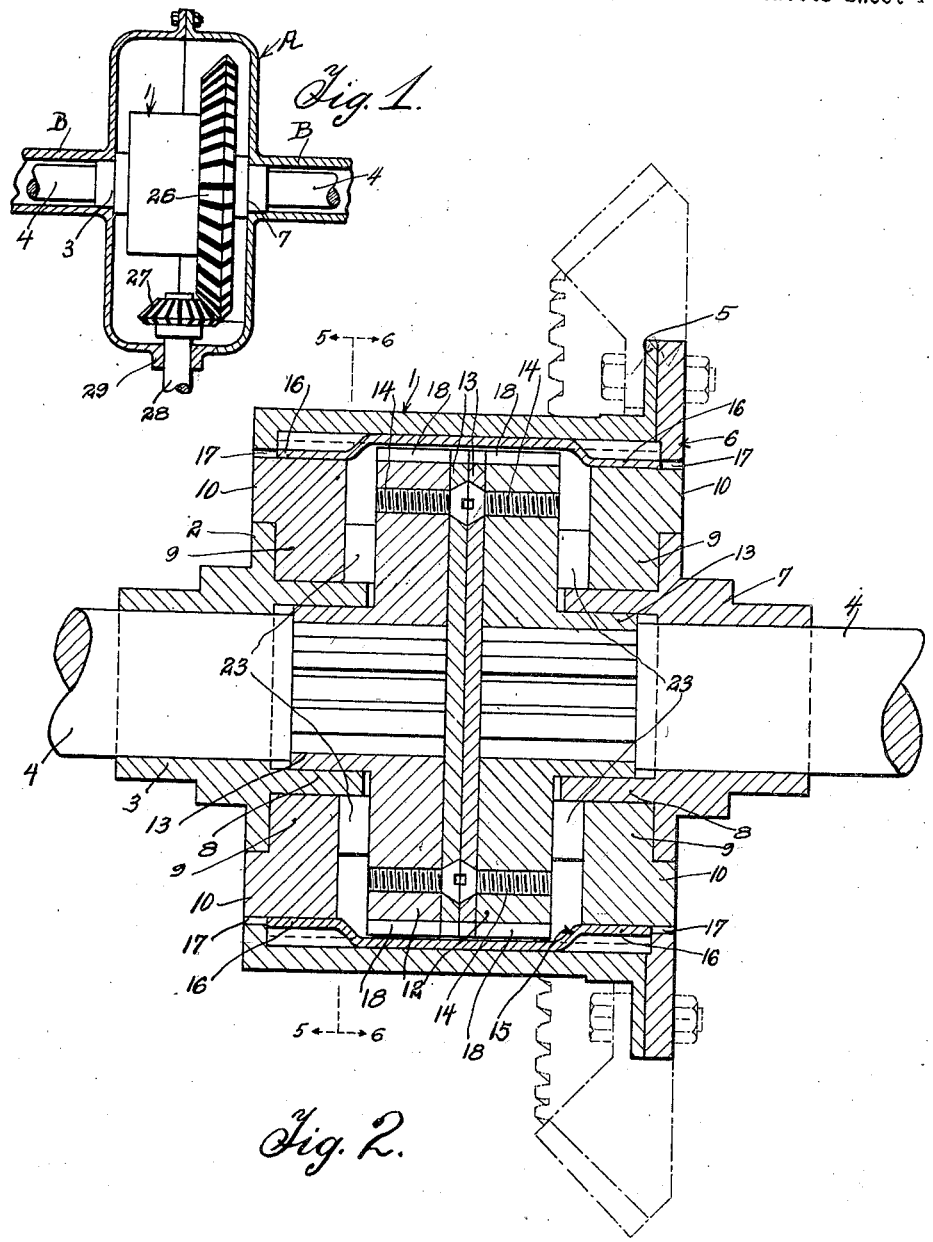
Figure 1 is a plan view, partly in section, of the differential as applied.
Figure 2 is a central sectional view through the differential.

The differential includes a cylindrical casing 1 closed at one end by an integral head 2 from which extends a sleeve 3 for reception of one of the axles 4. Casing 1 is provided, at its other end, with an outwardly projecting peripheral flange 5 to which is secured, in any suitable or preferred manner, a closure plate 6 provided with a sleeve 7 which receives the other axle 4, these axles being disposed in alinement.

Each of the sleeves 3 and 7 is provided with an inwardly projecting collar or ring 8. Members 8 fit snugly through drive discs 9 each of which is provided with a plurality of outwardly projecting lugs 10 of segmental shape, these lugs fitting through openings 11 provided in head 2 and plate 6, which openings are of greater length than lugs 10 (Fig. 3). This construction permits casing 1 to turn a predetermined distance in either direction independently of the discs 9. When the casing has been turned so as to bring either lateral wall of openings 11 into contact with lugs 10 this establishes a positive driving connection between the casing and the discs so that the discs will rotate with the casing.

Two transmission discs 12 are mounted within casing 1 centrally thereof, these discs being provided with sleeves 13 for reception of axles 4 onto which the discs are keyed or secured in any other suitable or preferred manner. A wear plate or disc 13 is secured on the inner face of each disc 12, by means of screws 14, or in any other suitable or preferred manner, these plates being in contact with each other and co-acting with collars 8 to prevent movement of discs 12 axially of casing 1. A suitable liner 15 is secured in casing 1. This liner is pressed, at each end, to provide two diametrically opposite inwardly projecting ribs 16 which fit into corresponding grooves 17 provided in discs 9, discs 12 being provided with alined grooves 18 to accommodate ribs 16 at the inner end of liner 15 to permit the liner to be inserted into the casing. This liner encloses the discs 9 and 12 and associated parts and provides lubricant retaining means.

Each disc 9 carries four locking dogs 18 of flattened V-shape, these dogs being rockably mounted on pins 19 secured in the disc and operating in inwardly flaring openings 20 extending through the disc. Dog 18 is provided, in its outer edge, with an arcuate recess which receives rounded head 21 of a pin 22 secured in end head 2 of casing 1. The dogs carried by the other disc 9 are similarly mounted on pins secured in closure plate 6. When casing 1 is turned a short distance in either direction the dogs 18 will be rocked, by means of pins 22, so as to project one arm of the dog and retract the other arm, depending upon the direction in which the casing is turned.

Each disc 12 carries four blocks 23 slidable in openings 24 in the disc; each block being normally held projected by an expansion spring 25 confined between the block and plate 13, these blocks projecting outwardly from the outer faces of the discs 12 and pressing against the inner faces of discs 9. The blocks are so disposed as to be positioned between adjacent ends of dogs 18 (Figures 5 and 6). When casing 1 is turned a slight distance in either direction, the dogs 18 are rocked so as to project one arm of each dog so that, contact of the projected arms of the dogs with blocks 23 will impart rotation to discs 12, upon continued rotation of casing 1 and discs 9, thus rotating axles 4 which are in this manner positively connected to the casing for rotation therewith, the axles being rotated at the same speed under normal conditions. As clearly illustrated in Figure 4, and as will be understood from the above described operation of the differential, when the dog 18ª is rocked into its extreme position in either direction, the projected arm of this dog is positioned for contact with abutment member or block 23 and the retracted arm of the dog is in contact with and bears against the adjacent end wall of opening 20. By this arrangement the dogs 18ª are subjected to compressive strains only, the pressure on the projected arm of the dog being transmitted to the disc 9 thus relieving pivot member 19 of all strains and producing a comparatively light and compact structure well able to withstand the severe strains to which it is subjected in use. In making a turn, at which time one of the axles will rotate at higher speed than the other axle, the disc 12 carried by the axle rotated at the higher speed can readily rotate at higher speed than the other disc 12, since the blocks 23 carried by the disc rotated at the higher speed will be forced inwardly against the action of springs 25 so as to pass over the projected arms of the dogs carried by the adjacent disc 9. During this operation the dogs of the discs 9 are locked in rocked adjustment by pins 22 carried by head 2 of casing 1 and closure plate 6. If it is desired to reverse the direction of drive, the dogs are automatically moved into reversed position by the action of casing 1 and the parts associated therewith. This is accomplished by having the openings 11 of greater length than lugs 10 of discs 9. During rotation of casing 1 lugs 10 are in contact with one of the end walls of openings 11 so as to rotate discs 9 with the casing in the manner described. When the direction of rotation of the casing is reversed, the casing turns a short distance independently of discs 9 thus rocking dogs 18 so as to reverse the operative positions of the dogs, after which the walls at the other ends of openings 11 contact with lugs 10 so as to rotate discs 9 with the casing thus reversing the differential, this operation being automatic and controlled by movement of the casing. This provides a differential of very simple and highly efficient construction in which all gearing is eliminated and danger of breakage of parts is done away with since the dogs are of very strong construction and are so positioned relative to blocks 23 as to fit snugly between and in contact with the blocks thus eliminating all sudden jerks or jars due to looseness of parts within the differential.

The casing 1 is, in practice, mounted in a differential casing A of an automobile in a known manner. Rear axle housings B extend from this casing and enclose the axles 4. A bevel gear ring 26 is secured on flange 5 of casing 1 in any suitable or preferred manner. This gear ring meshes with a bevel pinion 27 secured on a drive shaft 28 extending through a housing 29 which extends from differential casing A. This differential may be readily applied to automobiles of standard construction and is of very simple and highly efficient construction while being positive in its operation and readily able to withstand the severe strains to which a differential is subjected in use.

What I claim is:—

1. In combination with a driven casing, transmission discs within the casing, axles secured to said discs, drive discs, means for establishing direct and positive driving connections between the drive discs and the casing when said casing is turned a predetermined distance in either direction, said means permitting independent turning movement of the casing in either direction through a predetermined distance, and means actuated by the independent turning movement of the casing for establishing driving connections between the drive discs and the transmission discs, the last mentioned means permitting rotation of the axles at different speeds.

2. In combination with a driven casing provided with circumferentially extending openings, transmission discs within the casing, axles secured to said discs, drive discs provided with elements projecting into and of less length than said openings whereby the casing has limited turning movement in either direction about the drive discs, and means actuated by the independent turning of said casing for establishing driving connections between said drive discs and the transmission discs, said means permitting rotation of the axles at different speeds.

3. In combination with a driven casing provided with end heads having openings directed circumferentially of the casing, drive discs within the casing and provided with lugs projecting into and of less length than said openings whereby the casing has limited turning movement in either direction about the drive discs, transmission discs between the drive discs, axles secured to the transmission discs, and means actuated by the independent turning of said casing for establishing driving connections between said drive discs and the transmission discs, said means permitting rotation of the axles at different speeds.

4. In combination with a driven casing, transmission discs within the casing, axles secured to said discs, drive discs, means for establishing driving connections between said drive discs and the casing and for permitting independent turning movement of the casing relative to the drive discs in either direction through a predetermined distance, said drive discs being provided with openings, dogs rockably mounted in said openings and each provided with oppositely directed arms, the openings and the dogs being so related that when one arm of the dog is projected the other arm is retracted and is in contact with the adjacent end wall of the opening, spring pressed abutment members slidably mounted in the transmission discs for movement toward and away from the drive discs, said abutment members being normally projected in the path of travel of the dogs, and means actuated by the limited independent turning movement of the casing for rocking said dogs to project one arm and retract the other arm thereof in accordance with the direction in which the casing is driven.

5. In combination with a driven member, transmission discs, axles secured to said discs, drive discs adjacent to the transmission discs and each provided with a plurality of openings, dogs pivotally mounted between their ends in said openings, abutment members slidably mounted in the transmission discs for movement toward and away from the drive discs, said members being disposed in the path of travel of the dogs, resilient means for normally holding the abutment members projected, means for establishing driving connections between the casing and the drive discs and for permitting limited turning movement of the casing relative to the drive discs, and means actuated by the relative turning movement of the casing for rocking the dogs so as to retract one arm and project the other arm thereof, the dogs and the respective openings therefor being so related that the end of the retracted arm of the dog contacts with the adjacent end wall of the dog opening.

6. In combination with a driven casing, drive discs within the casing, means for establishing driving connections between said discs and the casing and for permitting limited independent turning movement of the casing about the discs in either direction, transmission discs between the drive discs, axles secured in the transmission discs, the drive discs being provided with openings flaring inwardly toward the transmission discs, dogs of substantially flattened V-shape pivotally mounted at their central portions in said openings and so disposed as to have one arm projected and the other arm retracted when rocked in either direction, the retracted arm being in contact with the adjacent end wall of the dog opening, abutment members slidably mounted in the transmission discs for movement toward and away from the drive discs, said abutment members being disposed in the paths of travel of the dogs, resilient means for normally holding the abutment members projected, and means actuated by the independent movement of the casing about the drive discs for rocking the dogs about their pivots.

7. In a differential of the character described, a driven casing provided with end plates secured to the casing, said plates having openings, drive discs in the casing and provided with lugs projecting into the openings, said openings being of greater length than the lugs to permit turning of the casing in either direction through a predetermined distance independently of the discs, transmission discs between the drive discs, blocks mounted in the transmission discs, means for normally holding said blocks projected beyond the outer faces of said transmission discs and for permitting inward movement of said blocks, locking members rockably mounted in the drive discs, and connections between said locking members and the casing for projecting the former into the path of the blocks upon movement of the casing in either direction independently of the drive discs.

8. In a differential of the character described, a driven casing provided with end plates secured to the casing, said plates having openings, drive discs in the casing and provided with lugs projecting into the openings, said openings being of greater length than the lugs to permit turning of the casing in either direction through a predetermined distance independently of the discs, transmission discs between the drive discs, blocks mounted in the transmission discs, means for normally holding said blocks projected beyond the outer faces of said transmission discs and for permitting inward movement of said blocks, locking dogs rockably mounted in the drive discs and having oppositely directed arms disposed to be projected beyond the inner faces of the drive discs when the dogs are rocked in either direction, and connections between said casing and the dogs for rocking the latter in accordance with movement of the former independently of the drive discs, said connections holding the dogs in rocked adjustment.

In testimony whereof I affix my signature.

S. O. HULETT.